United States Patent
De Miceli et al.

(10) Patent No.: US 7,299,954 B2
(45) Date of Patent: Nov. 27, 2007

(54) HANDHELD EXTRUDER WELDING DEVICE

(75) Inventors: Guiseppe De Miceli, Menziken (DE); Hans Arnold, Kägiswil (CH)

(73) Assignee: Leister Process Technologies, Sarnen (CH)

( * ) Notice: Subject to any disclaimer, the term of this patent is extended or adjusted under 35 U.S.C. 154(b) by 326 days.

(21) Appl. No.: 11/219,220

(22) Filed: Sep. 2, 2005

(65) Prior Publication Data
US 2006/0054661 A1 Mar. 16, 2006

(30) Foreign Application Priority Data
Sep. 8, 2004 (EP) ................... 04021264

(51) Int. Cl.
*B65D 88/54* (2006.01)
(52) U.S. Cl. ............... 222/413; 222/572; 222/324
(58) Field of Classification Search ............... 222/324, 222/413, 572, 504, 333
See application file for complete search history.

(56) References Cited

U.S. PATENT DOCUMENTS 5,153,008 A * 10/1992 Koch ............... 222/146.5
5,988,865 A 11/1999 Bacher et al.
6,223,950 B1 * 5/2001 Lasko ............... 222/146.5
6,431,409 B1 * 8/2002 Gehde ............... 222/413

FOREIGN PATENT DOCUMENTS

| DE | 196 39 048 A1 | 3/1998 |
| EP | 0 887 116 A2 | 12/1998 |
| EP | 1 023 948 A2 | 8/2000 |
| JP | 59 067030 | 4/1984 |

OTHER PUBLICATIONS

European Search Report for corresponding Application No. 04021264.9 dated Feb. 23, 2005.

* cited by examiner

*Primary Examiner*—Yogendra N. Gupta
*Assistant Examiner*—Thu Khanh T. Nguyen
(74) *Attorney, Agent, or Firm*—Renner, Otto, Boisselle & Sklar, LLP

(57) ABSTRACT

A handheld extruder welding device is provided for welding thermoplastic synthetic materials by means of an extrusion screw with a feed zone and a conveying/plasticizing zone. In the area of the feed zone, a feed channel with a ridge running in longitudinal direction is located in a sleeve. This ridge prevents the inserted plastic welding wire from twisting and looping inside and especially outside the handheld extruder welding device.

20 Claims, 6 Drawing Sheets

HANDHELD EXTRUDER WELDING DEVICE

TECHNICAL FIELD

This invention concerns a handheld extruder welding device for welding thermoplastic synthetic materials by means of an extrusion screw driven by a drive system enclosed in a housing, a screw cylinder surrounding the extrusion screw, and at least one feed channel for the plastic welding wire that extends, at least partially, over the length of the feed zone of the extrusion screw and has the shape of a chute.

BACKGROUND OF THE INVENTION

Handheld extruder welding devices are familiar devices, and are used primarily for welding plastic panels or similar objects. Such devices consist essentially of a handheld drill serving as the drive system and a removable attachment for this drill. In the attachment, a strand of plastic in the shape of a plastic wire that is supplied via a feed channel and a feed device is first chopped up, and is then plasticized by means of a screw and a heating device. A welding device of this type is known from DE-A-28 23 171, for example.

These familiar handheld extruder welding devices, also known from EP-A 1 023 948 or EP-B 0 637 497, have a feed channel that extends, at least partially, over the length of the feed zone of the extrusion screw and has the shape of a chute, and serves to put the plastic welding wire in contact with the feed screw.

In all known handheld extruder welding devices, twisting of the plastic welding wire is a problem because, due to the rotation of the extrusion screw, the plastic welding wire is twisted around its longitudinal axis, in addition to its previous twisting caused by its unwinding from a spool device. This causes undesirable loops and twists that make it harder to handle and may require an interruption of the welding process in order to eliminate the loops.

SUMMARY OF THE INVENTION

This invention addresses the problem by proposing a handheld extruder welding device where the plastic welding wire is not twisted, or twisted only slightly, around its longitudinal axis during the feeding process.

This problem is solved by a handheld extruder welding device with the characteristics specified in the main claim. Additional advantageous design variants are described in the sub-claims.

According to the invention, in its feed channel, the handheld extruder welding device has a ridge running in longitudinal direction that presses into the plastic welding wire, holding it in position with the result that it is not twisted to any significant degree by the rotation of the extrusion screw. This has the effect that the plastic welding wire protruding from the handheld extruder welding device is positively prevented from twisting, as desired. In principle, this ridge may be designed with edges or as a round element. Preferably, the ridge is sharp in order to avoid friction loss, on the one hand, and in order to engage the plastic welding wire to the greatest possible extent for the purpose of positive guidance.

In principle, more than one sharp longitudinal ridge may be used, although, preferably, one ridge at the bottom of the feed channel, i.e. in an area across from the feed zone of the extrusion screw, is sufficient. It is essential, however, that the ridge is sufficiently sharp and that the inserted plastic welding wire is held positively in longitudinal direction and that the sharp edge pressing into it prevents it from twisting.

In accordance with a preferred design, the bottom of the feed channel runs at an angle to the extrusion screw so that the depth of the feed channel decreases continuously, tapering off at the end. This has the effect of continuously increasing the penetration depth of the plastic welding wire into the feed zone of the handheld extruder welding device during the feeding process.

Depending on the production process, the feed channel may be located in a one- or two-piece sleeve surrounding the extrusion screw. This offers considerable advantages for the manufacture and assembly of the handheld extruder welding device because the sleeve can be made separately and is easy to insert. In a one piece sleeve, the feed channel can be made by means of wire erosion, and by means of a cutting process in a two-piece sleeve. Sintering processes are also suitable for this.

In accordance with a special design of the handheld extruder welding device, the sleeve is held in a holding element of the housing with a central passage for the extrusion screw, surrounding the extrusion screw in the feed zone. Holding the feeding sleeve in position in this manner offers enormous advantages in terms of cost-efficient manufacture as well as a high degree of stability. Depending on the design of the handheld extruder welding device, the holding element may serve simultaneously as a cooling body carrying a housing in which, in contrast to the state of technology, the drive system as well as parts of the heating device are integrated. In addition, the holding element/cooling body may also serve for clamping the gear output for the extrusion screw. It is also possible to use the holding element only as a separating element for the gear output of a handheld extruder welding device. Thus, the arrangement of the feed channel in such a design permits various designs of handheld extruder welding devices without a change of the sleeve.

Below, the invention is explained in detail in conjunction with the attached drawings.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
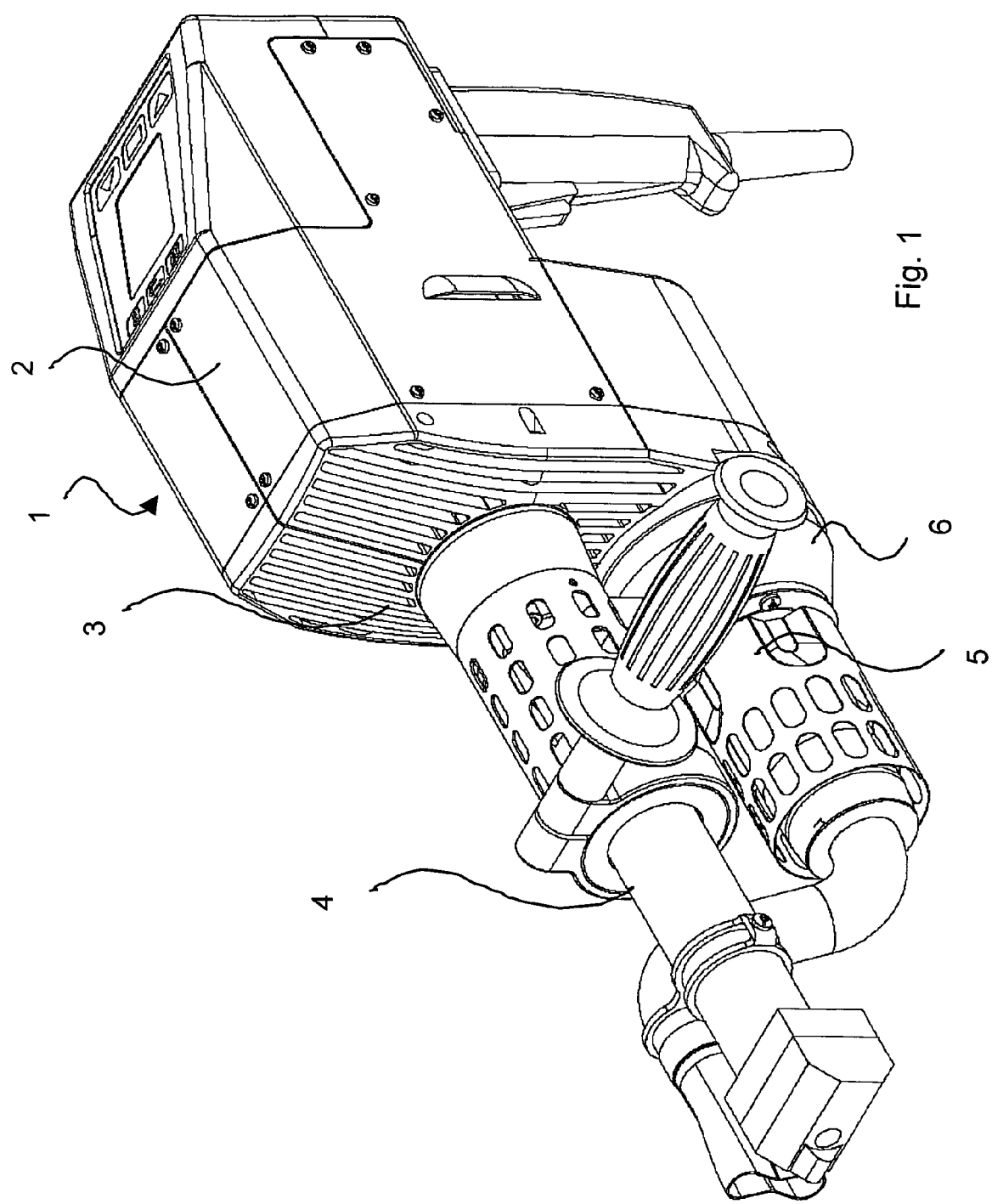
FIG. 1 shows a perspective view of a handheld extruder welding device with a housing in which the drive system and the blower unit are integrated.

FIG. 1 shows a design variant of a handheld extruder welding device 1 with a housing 2 having a cooling body 3 as base component and bearing element.

On the other side of the cooling body 3, a screw cylinder 4 contains an extrusion screw 8 and a heating device 5 preceded by a blower 6. The extrusion screw 8 has a feed zone 11 (FIG. 3) and a conveying/plasticizing zone.

Figure 2:
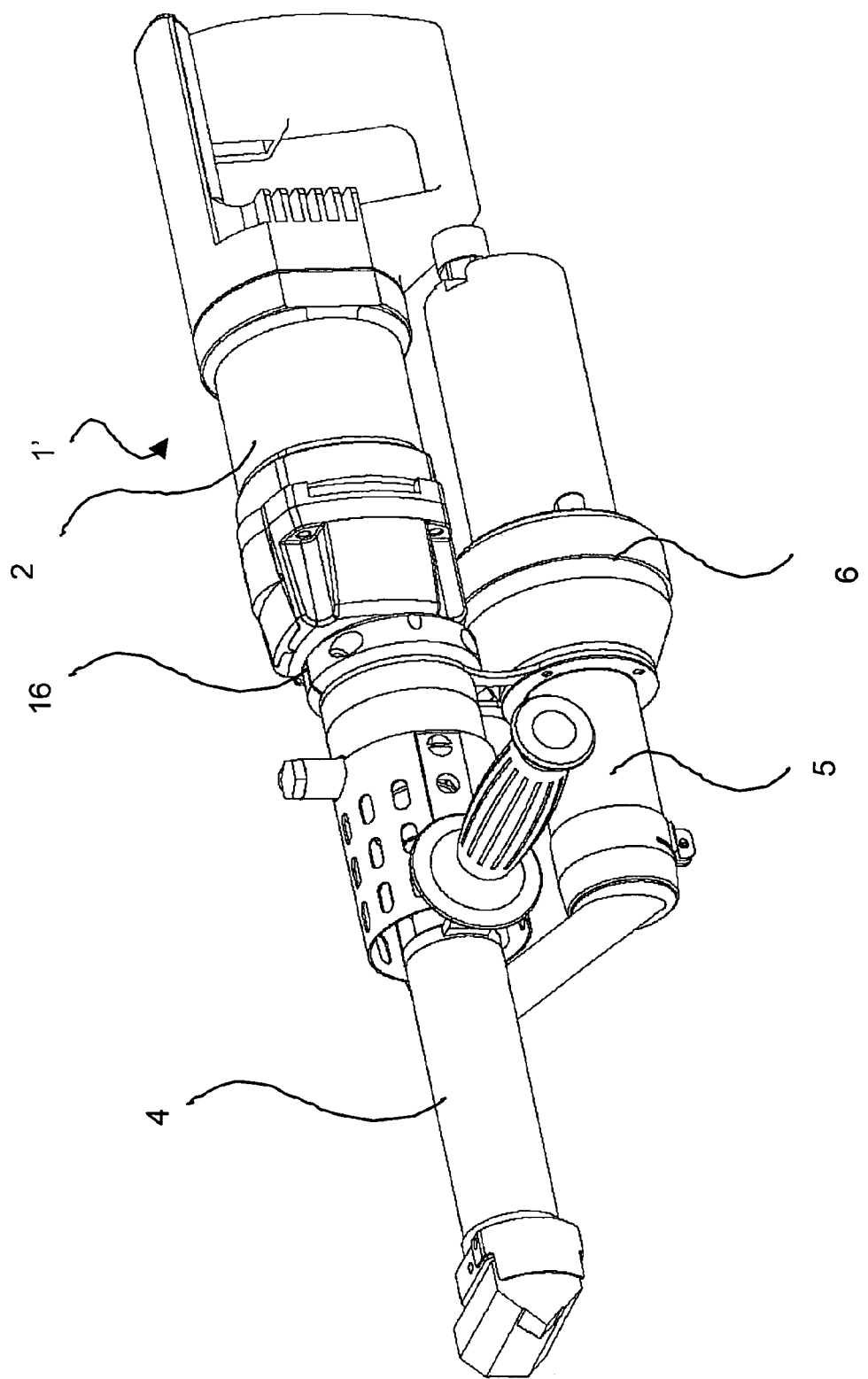
FIG. 2 shows a perspective view of a different handheld extruder welding device where the drive system and the blower are not integrated in one housing.

FIG. 2 shows a different design of a handheld extruder welding device 1' where the heating device 5 preceded by the blower 6 is not integrated in the housing 2, and therefore does not have a cooling body 3 as shown in FIG. 1.

Figure 3:
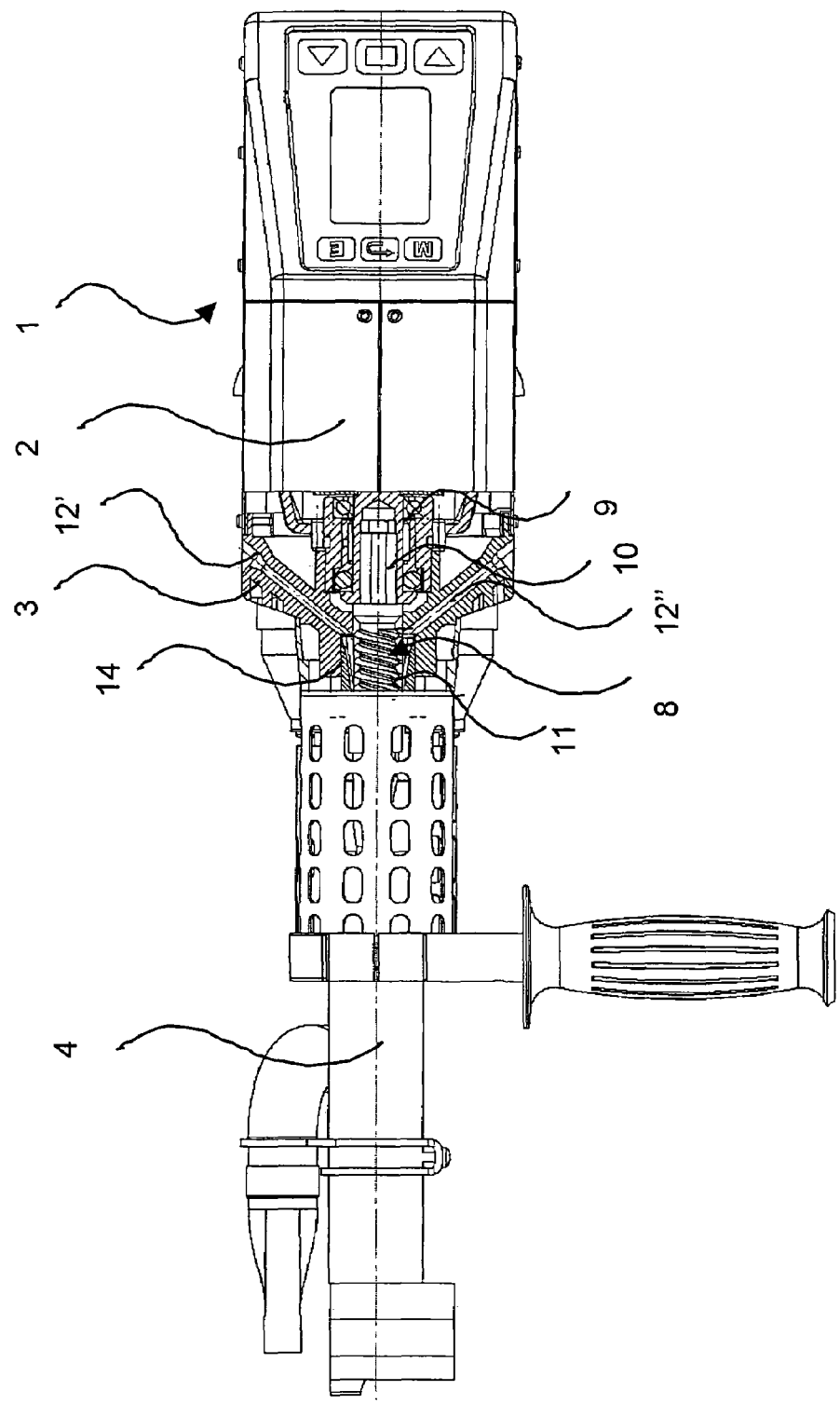
FIG. 3 shows a top view of a handheld extruder welding device according to the FIG. 1 with a partial section of the feed zone of the extrusion screw.

In a partial section of the handheld extruder welding device 1 according to FIG. 1, FIG. 3 shows part of the extrusion screw 8 with the shaft 10 inserted in the bearing 9, and the feed zone 11 that follows it.

Figure 4:
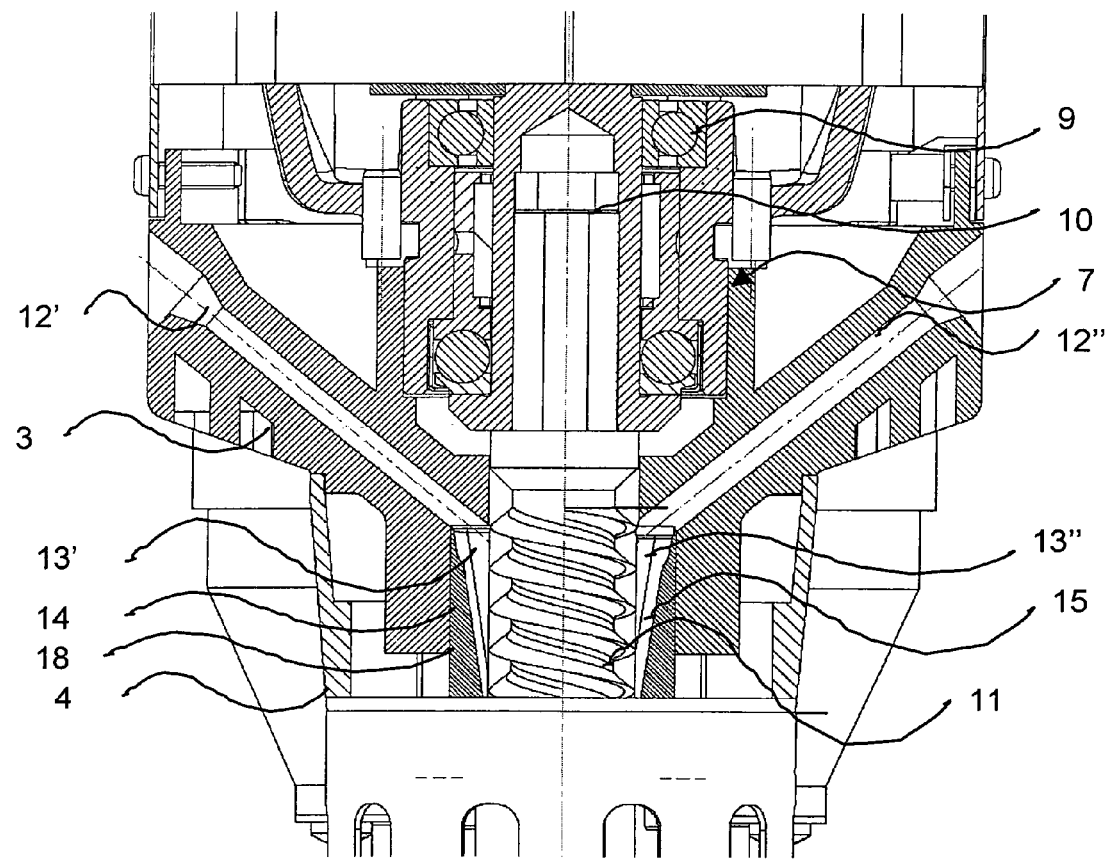
FIG. 4 shows an enlarged view of the partial section in FIG. 3.

The enlarged view in FIG. 4 shows two different supply channels 12' and 12" in the cooling body 3 for welding wires of different diameters that each end in a feed channel 13' and 13" in a feed sleeve 14 surrounding the feed zone 11. The feed channels 13', 13" are groove-shaped and run at an angle to the extrusion screw 8. At the bottom of each feed channel, a sharp ridge running in longitudinal direction is located that prevents a twisting of the plastic welding wire during the feeding process.

The feed sleeve 14, consisting of one piece in this design variant, is inserted into a connector 16 in the cooling body 3. The cooling body 3 also serves as a clamping element for clamping the gear output 7 with integrated bearing 9 for the shaft 10 of the extrusion screw 8.

Figure 5:
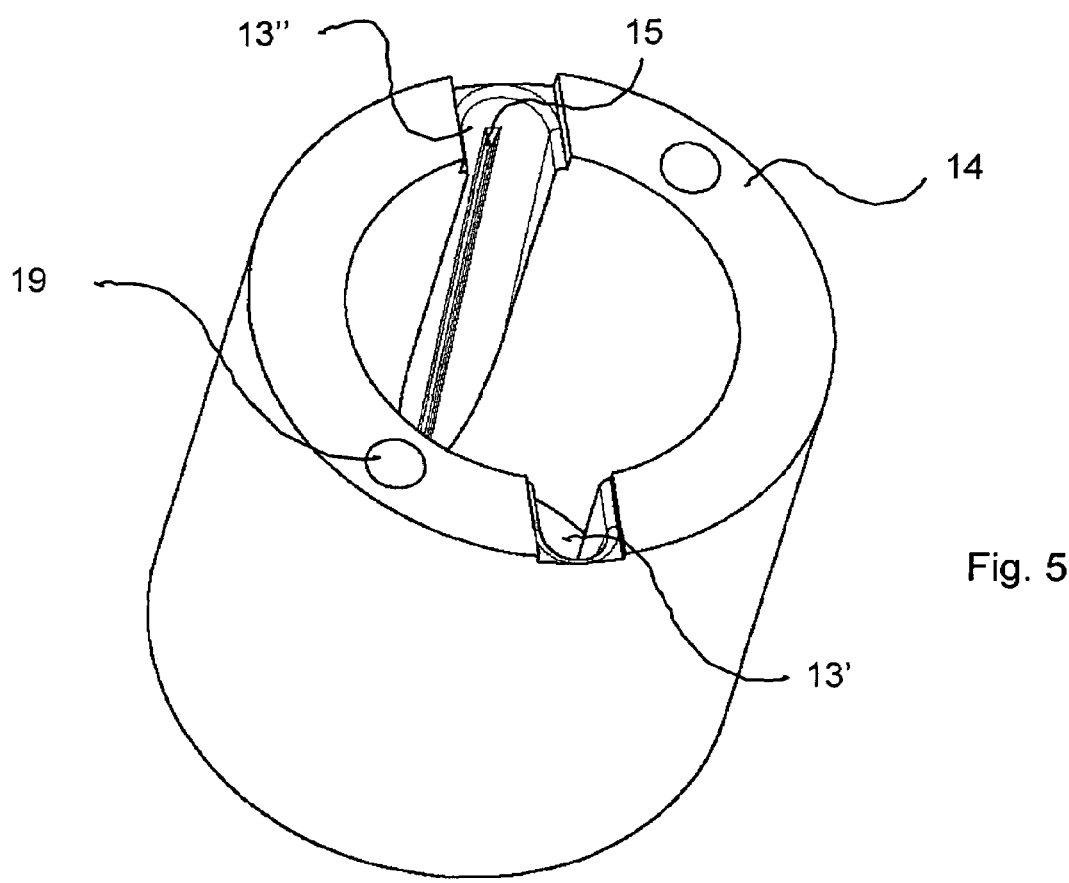
FIG. 5 shows the perspective front view of a feed sleeve.
Figure 6:
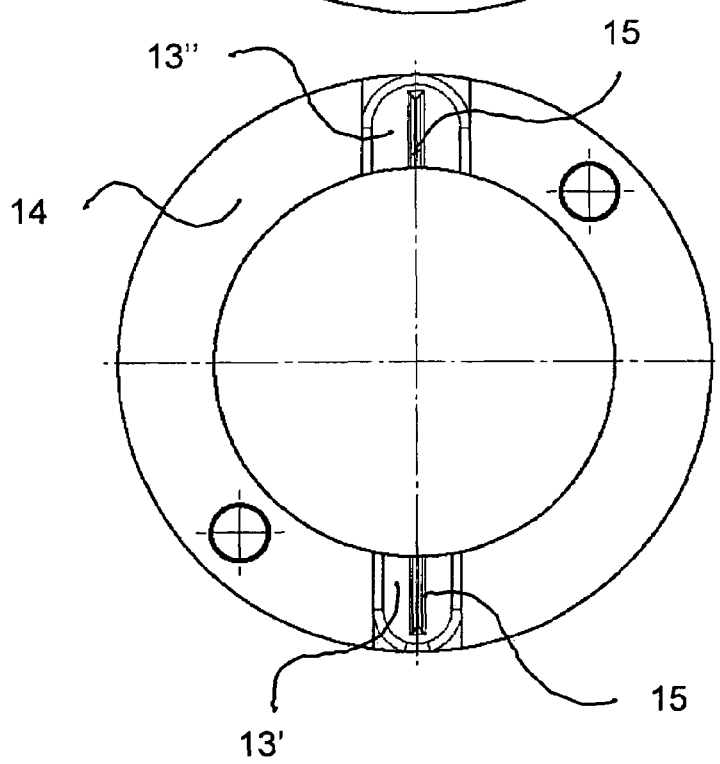
FIG. 6 shows the front view of a one-piece feed sleeve.

FIGS. 5 and 6 show various views of the feed sleeve 14 with the groove-shaped feed channels 13' and 13" for welding wires of different diameters, and of the sharp ridge 15 running in longitudinal direction in these channels. As the figures show, the feed channels 13' and 13" taper off toward the end of the sleeve so that the entire welding wire reaches the feed zone of the extrusion screw 8. The bores 19 serve as twist preventers by means of pins that engage them. In one design variant, the height of the ridge 15 is 0.2 mm, with an initial channel depth of 3 mm.

Figure 7:
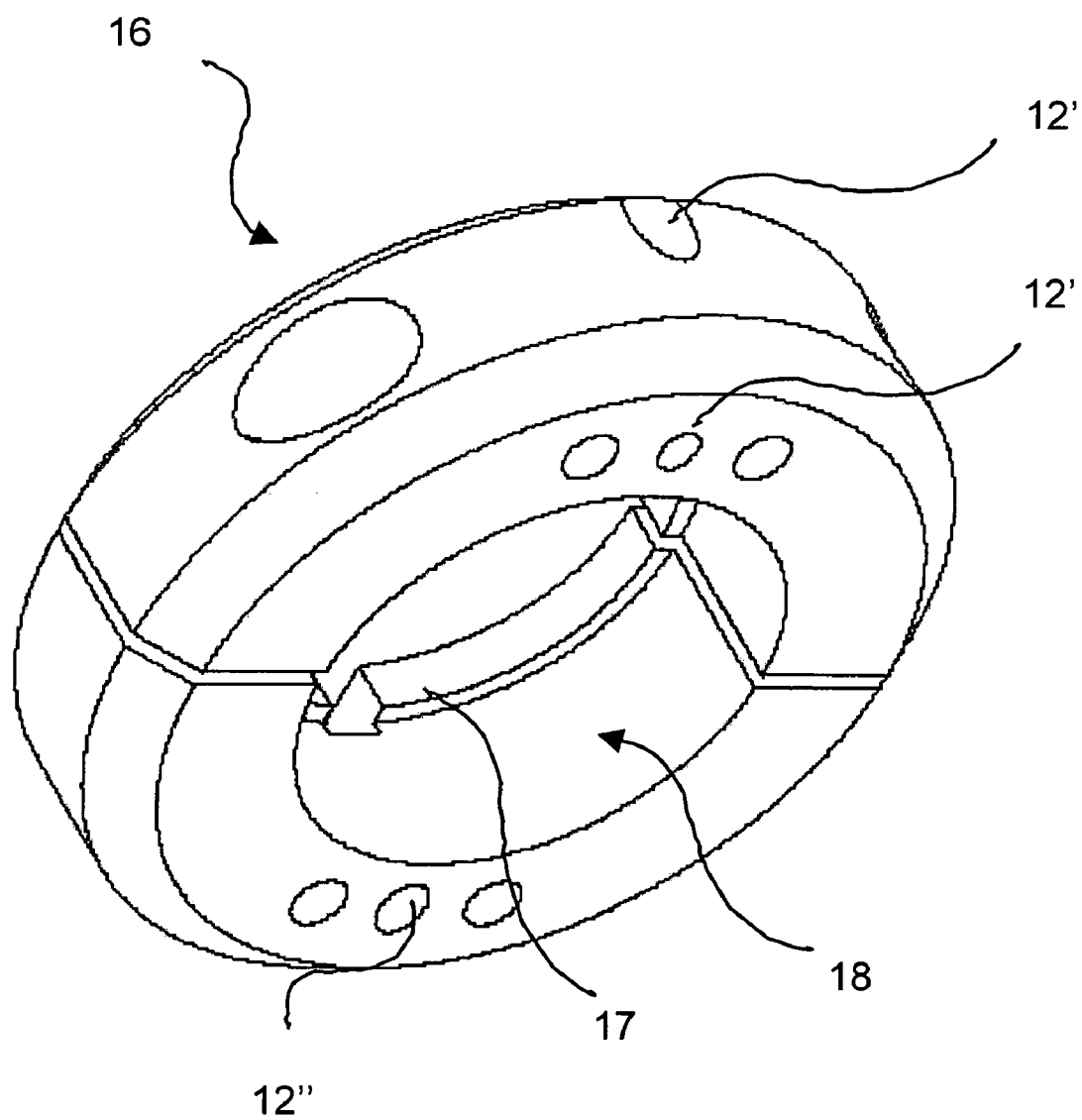
FIG. 7 shows the perspective front view of a clamping element for a handheld extruder welding device in accordance with FIG. 2.

And finally, FIG. 7 shows a perspective front view of a two-piece clamping element 16 as used in a handheld extruder welding device 1' according to FIG. 2. The central passage 18 clamps the gear output 7. The shoulder 17 serves for the axial absorption of forces.

The invention claimed is:

1. A handheld extruder welding device for welding thermoplastic synthetic materials by means of an extrusion screw in a screw cylinder surrounding the extrusion screw that is driven by a drive system enclosed in a housing, and has at least one feed channel for a plastic welding wire that extends, at least partially, over the length of the feed zone of the extrusion screw and has the shape of a chute, wherein the feed channel has at least one ridge running in longitudinal direction.

2. The handheld extruder welding device according to claim 1, wherein the ridge is located in a section of the feed channel that is opposite the feed zone of the handheld extruder welding device.

3. The handheld extruder welding device according to claim 2, wherein the top of the ridge is sharp.

4. The handheld extruder welding device according to claim 1, wherein the top of the ridge is sharp.

5. The handheld extruder welding device according to claim 4, wherein the bottom of the feed channel runs at an angle to the extrusion screw, and, starting where the welding wire enters the feed channel, the depth of the feed channel decreases continuously and tapers off at the end.

6. The handheld extruder welding device according to claim 1, wherein the bottom of the feed channel runs at an angle to the extrusion screw, and, starting where the welding wire enters the feed channel, the depth of the feed channel decreases continuously and tapers off at the end.

7. The handheld extruder welding device according to claim 2, wherein the bottom of the feed channel runs at an angle to the extrusion screw, and, starting where the welding wire enters the feed channel, the depth of the feed channel decreases continuously and tapers off at the end.

8. The handheld extruder welding device according to claim 3, wherein the bottom of the feed channel runs at an angle to the extrusion screw, and, starting where the welding wire enters the feed channel, the depth of the feed channel decreases continuously and tapers off at the end.

9. The handheld extruder welding device according to claim 8, wherein the feed channel is located in a one- or two-piece feed sleeve that surrounds the feed zone of the extrusion screw.

10. The handheld extruder welding device according to claim 1, wherein the feed channel is located in a one- or two-piece feed sleeve that surrounds the feed zone of the extrusion screw.

11. The handheld extruder welding device according to claim 2, wherein the feed channel is located in a one- or two-piece feed sleeve that surrounds the feed zone of the extrusion screw.

12. The handheld extruder welding device according to claim 3, wherein the feed channel is located in a one- or two-piece feed sleeve that surrounds the feed zone of the extrusion screw.

13. The handheld extruder welding device according to claim 4, wherein the feed channel is located in a one- or two-piece feed sleeve that surrounds the feed zone of the extrusion screw.

14. The handheld extruder welding device according to claim 5, wherein the feed channel is located in a one- or two-piece feed sleeve that surrounds the feed zone of the extrusion screw.

15. The handheld extruder welding device according to claim 6, wherein the feed channel is located in a one- or two-piece feed sleeve that surrounds the feed zone of the extrusion screw.

16. The handheld extruder welding device according to claim 7, wherein the feed channel is located in a one- or two-piece feed sleeve that surrounds the feed zone of the extrusion screw.

17. The handheld extruder welding device according to claim 9, wherein, on the housing side, the feed sleeve is held in a holding element with a central passage.

18. The handheld extruder welding device according to claim 10, wherein, on the housing side, the feed sleeve is held in a holding element with a central passage.

19. The handheld extruder welding device according to claim 11, wherein, on the housing side, the feed sleeve is held in a holding element with a central passage.

20. The handheld extruder welding device according to claim 12, wherein, on the housing side, the feed sleeve is held in a holding element with a central passage.

* * * * *